United States Patent
Lenhardt et al.

(10) Patent No.: US 6,250,255 B1
(45) Date of Patent: Jun. 26, 2001

(54) METHODS AND APPARATUS FOR ALERTING AND/OR REPELLING BIRDS AND OTHER ANIMALS

(75) Inventors: Martin L. Lenhardt, Hayes; Alfred L. Ochs, Richmond, both of VA (US)

(73) Assignee: Virginia Commonwealth University, Richmond, VA (US)

(*) Notice: Subject to any disclaimer, the term of this patent is extended or adjusted under 35 U.S.C. 154(b) by 0 days.

(21) Appl. No.: 09/369,254

(22) Filed: Aug. 6, 1999

Related U.S. Application Data
(60) Provisional application No. 60/095,446, filed on Aug. 6, 1998, provisional application No. 60/095,449, filed on Aug. 6, 1998, and provisional application No. 60/095,448, filed on Aug. 6, 1998.

(51) Int. Cl.$^7$ .............................. A01K 15/02; H04B 1/02; G08B 3/10
(52) U.S. Cl. .................... 119/713; 119/719; 119/908; 340/384.2; 367/139
(58) Field of Search .................... 119/713, 719, 119/908; 340/573, 384.2; 367/139; 43/1, 98

(56) References Cited

U.S. PATENT DOCUMENTS

| | | |
|---|---|---|
| 3,317,889 * | 5/1967 | Barrand . |
| 3,831,548 | 8/1974 | Droege . |
| 3,872,472 | 3/1975 | Moschgat . |
| 4,178,578 * | 12/1979 | Hall ................................. 367/139 |
| 4,284,845 | 8/1981 | Belcher . |
| 4,352,292 * | 10/1982 | Madigosky et al. .............. 73/575 |
| 4,392,215 * | 7/1983 | Hall ................................. 367/139 |
| 4,475,102 | 10/1984 | Troy et al. . |
| 4,562,561 | 12/1985 | Ackley . |
| 4,646,276 * | 2/1987 | Kowalewski et al. ............. 367/139 |

(List continued on next page.)

FOREIGN PATENT DOCUMENTS
3316196 A1 * 11/1984 (DE) .

OTHER PUBLICATIONS

Responses of the Auditory System to Microwave Pulses; Wilson et al.; Microwave Action on the Auditory System; pp 496–526.

Microwave–Induced Acoustic Effects in Mammalian Auditory Systems and Physical Materials; A. Guy et al.; Dept. of Rehab. Medicine Bioelectro; Research Laboratory Univ. of Wash School of Medicine; Seattle, Washington 98195; pp. 194–218.

Significance of Microthermal Effects Derived from Low Level UHF–Microwave Irradiation of the Head: indirect Caloric Vestibular Stimulation; R. Lebovitz et al.; J. Theor. Biol. (1973) 41, pp. 209–221.

Detection of Weak Electromagnetic Radiation by the Mammalian Vestibulocochlear Aparatus; R. Lebovitz; Annals New York Academy of Sciences; pp. 182–193.

*Primary Examiner*—Charles T. Jordan
*Assistant Examiner*—Yvonne R. Abbott
(74) *Attorney, Agent, or Firm*—McGuireWoods LLP

(57) ABSTRACT

An external stimuli is provided that alerts animals to danger and/or repels the animals from certain areas. More specifically, the system and method of the present invention uses an external stimuli, such as, for example, pulsing microwaves, vibration or supersonic sound waves, in order to alert birds or other animals of danger and/or repel these same birds or animals from specific areas. These produced external stimuli may provide a reversible unpleasant sensation to the birds and other animals so that they will not only be repelled from a specific area, such as an airport, but also will avoid returning to such area. One such unpleasant sensation that is virtually harmless to the birds and other animals is the sensation of dizziness.

28 Claims, 12 Drawing Sheets

U.S. PATENT DOCUMENTS

| | | |
|---|---|---|
| 4,656,770 | 4/1987 | Nuttle . |
| 4,658,386 | 4/1987 | Morris . |
| 4,761,770 | 8/1988 | Kim et al. . |
| 4,769,794 | 9/1988 | Beuter et al. . |
| 4,884,809 * | 12/1989 | Rowan ................................ 463/47.3 |
| 4,903,630 | 2/1990 | Rezmer . |
| 4,933,918 | 6/1990 | Landsrath et al. . |
| 4,955,005 * | 9/1990 | Loeffelman .......................... 367/139 |
| 4,965,552 * | 10/1990 | Price et al. .......................... 340/566 |
| 4,991,145 | 2/1991 | Goldstein et al. . |
| 4,998,091 | 3/1991 | Rezmer . |
| 4,999,818 | 3/1991 | Malleolo . |
| 5,047,994 * | 9/1991 | Lenhardt et al. .................... 367/116 |
| 5,058,335 | 10/1991 | Richter . |
| 5,061,918 | 10/1991 | Hunter . |
| 5,208,787 | 5/1993 | Shirley . |
| 5,214,411 | 5/1993 | Herbruck . |
| 5,214,619 * | 5/1993 | Yoshida ................................ 367/139 |
| 5,270,707 | 12/1993 | Schulte et al. . |
| 5,368,044 * | 11/1994 | Cain et al. .......................... 128/739 |
| 5,450,063 | 9/1995 | Peterson et al. . |
| 5,610,876 | 3/1997 | Jeffers . |
| 5,774,088 | 6/1998 | Kreithen . |
| 5,870,972 * | 2/1999 | Zinter et al. ........................ 119/719 |
| 5,969,593 * | 10/1999 | Will .................................... 340/384.2 |
| 6,016,100 * | 1/2000 | Boyd et al. ........................ 340/384.2 |

\* cited by examiner 5.0 Hz MAXIMUM, 50 μsec PULSES

FOURIER SPECTRUM OF PULSE-INTERVAL MODULATED PULSES 4.0 Hz 50 μsec PULSES

FOURIER SPECTRUM OF AM PULSES

SINGLE FOCUSED SUPERSONIC BEAM

PLURALITY OF FOCUSED BEAMS DIFFERING IN FREQUENCY

BRAIN RESONANCE
NO BOUNDARY CONDITIONS

$$f_1 = c/2\pi$$

| RADIUS $a$ (cm) | $2a$ | $f_1$ (kHz) | SPECIES |
|---|---|---|---|
| • 2 | 4 | 36.5 | LARGE BIRD |
| • 1.6 | 3.2 | 45.6 | |
| • 1.5 | 3 | 48.6 | |
| • 1 | 2 | 73 | SMALL BIRD |

• $F_1$ FUNDAMENTAL FREQUENCY; C SOUND VELOCITY

FIG. 13

MIDDLE EAR RESONANCE

| SPECIES | TYMPANUM | M.E. CAVITY (kHz) |
|---|---|---|
| • HUMAN | 2.91 | 2.91 |
| • CAT | 3.64 | 3.64 |
| • RAT | 9.09 | 9.09 |
| • BIRD | 3.5 | 3.4 – 3.7 |

BIRD MIDDLE EAR RESONANCE LIKE CAT;
CAT MICROWAVE CM = 34.8 kHz;
BIRD MICROWAVE CM ESTIMATE: 3 kHz.

FIG.14

METHODS AND APPARATUS FOR ALERTING AND/OR REPELLING BIRDS AND OTHER ANIMALS

CROSS-REFERENCE TO RELATED APPLICATIONS

This application is entitled to the benefit of Provisional Patent Applications Serial No. 60/095,446 filed Aug. 6, 1998, Serial No. 60/095,449 filed Aug. 6, 1998, and Serial No. 60/095,448 filed Aug. 6, 1998.

FIELD OF THE INVENTION

The present invention generally relates to systems and methods of alerting and/or repelling birds and other animals and, more particularly, to systems and methods of alerting and/or repelling birds and other animals by use of an external stimuli which provides a reversible unpleasant sensation such that the birds and other animals will be alerted of danger and/or repelled from a desired area.

BACKGROUND DESCRIPTION

It is well known that flying birds can represent hazards to aircraft, power lines, wind turbines, glass windows in tall buildings, and other objects which birds (or bats) might inadvertently strike during flight. By way of one example, it is well documented that birds roosting or feeding next to airport runways represent a hazard not only to themselves but also to the aircraft that are utilizing the airport. Being more specific, the birds are often startled by approaching aircraft and thus have a tendency to take to flight. In some instances, when the birds take to flight they may fly within the flight path of the aircraft and be sucked into a jet turbine with disastrous results. In further instances, the birds that have already taken to flight may be startled by the sound of an approaching aircraft traveling upwind, and in an attempt to escape may again be sucked into a jet turbine.

It is also well documented that in remote airports, aircraft have been known to collide with other animals that are grazing on or near the runways. These animals range from almost any possible vertebrate species, such as deer, cow, alligators, etc. As can be imagined, colliding with such large animals as deer or cow can cause tremendous damage to the aircraft, which may also include the loss of human life.

It is also known that animals, of varying species, may cause other problems, such as, nuisances in park settings, destruction of crops and live stock, and even human mutilations and in some cases death. For example, bird infestation, by virtue of numbers in a flock (e.g., starlings) or size (e.g., Canadian geese), are often a nuisance in parks, golf courses, urban areas, etc. Moreover, other animals like deer, rabbits and the like are known to graze on crops while wolves and other predatory animals regularly kill live stock, such as sheep and the like. Of most importance, are bears, wolves, alligators, etc. that have been known to attack and mutilate or kill children and adults.

These above problems have been addressed using many different animal repelling approaches and methods. These approaches include fencing, chemicals, etc., and in some extreme cases trapping or killing the animals. However, in recent years other approaches have been devised such as using electrical fencing, sound waves and the like, all having their own shortcomings to some extent.

With regard to repelling birds from airports, currently a combination of habitat reduction treatments using noxious smelling chemicals and general harassment procedures, such as noise cannon and metallic strips, are employed. However, these methods soon become ineffective because birds quickly habituate to a steady stimulus. As a last resort, birds are often destroyed, much to the dismay of animal rights activists and others.

Microwave Alerting and Repelling Methods

The use of microwave energy has also been employed to repel and alert animals. Wilson and Jones (1985) have shown that pulsed microwave radiation having frequencies in the heating range, e.g., those frequencies readily absorbed by water in the range of 0.9–4.0 GHz, induce detectable changes in the intra cochlear structures of the inner ear. The resulting thermoelastic expansion of fluids and structures in the inner ear activates the hair cell receptors in a manner indistinguishable from responses induced conventionally by auditory clicks. Lebovitz (1975) showed that the effects of pulsed microwave radiation extend throughout the vestibulocochlear apparatus, and specifically that hair cell receptors in the utricle and saccule of the balance system are affected in the same fashion as in the auditory system.

Moreover, U.S. Pat. No. 5,774,088 to Kreithen teaches a hazard warning system which radiates pulses of microwave energy in the frequency range of 1 GHz to about 40 GHz to alert and warn target flying birds of the presence of wind turbine electrical generators, power distribution systems, aircraft, and other protected areas. The warning system disclosed in Kreithen includes a control unit governing pulse control circuitry that outputs pulses ranging from about 5 $\mu$s to about 25 $\mu$s in duration. These pulses trigger a pulsed source of microwave energy that is coupled to a microwave antenna that emanates the warning radiation. The radiation is sensed by the birds auditory system, which may cause the birds to veer from a collision course. The Kreithen patent teaches that additional forms of warning such as sound and flashing light (as described in U.S. Pat. No. 5,270,707) would be desirable. Kreithen accurately observes that microwaves induced clicks in the avian auditory system will have no deterrent features per se, but would be perceived only as a clicking or buzzing sound within the head of the bird, and that birds easily habituate to this noise.

Ultrasound and Sonic Alerting and Repelling Methods

Other methods of repelling and alerting birds and other animals include the use of ultrasound or sonic energy within the hearing range of the birds and other animals. For instance, U.S. Pat. No. 5,208,787 to Shirley teaches the use of low frequency vibration and includes indirect structure coupling such as buildings, earth ground rods, and water/gas pipes. This coupling is electrical in nature and not a vibrational delivery system. It is noted that the Shirley vibration is not extended below 60 Hz and does not employ a waveguide to couple the vibration to the substrate. If the coupling was considered as vibrational, a very high amount of energy would be required to vibrate a building with sufficient energy such that the building acted as a radiator. There appears to be no prior art that teaches the use of very low vibration (60 Hz) as a substrate alerting/repelling method.

There are a number of arts that utilize other sound wave frequencies. At the present time there are no known prior art systems that appear to use supersonic sound waves for alerting and/or repelling birds and other animals. As an example, U.S. Pat. No. 5,610,876 to Jeffers teaches sound in the 7–10 kHz range which is used to repel marine mammals. It is important to note that marine mammals have an upper hearing range of 50–100 kHz. Thus, Jeffers is using "low frequency" by marine mammal standards, which is certainly not supersonic frequencies.

U.S. Pat. No. 4,999,818 to Malleolo discloses that ultrasound can be used to scare or induce behavioral change in species termed "pests and vermin", which appear to be small mammals of the rat variety. In these cases, the sound is ultrasonic in the 22–50 kHz range. This sound range is inaudible to humans but it is within the conventional auditory sensitivity range of these animals, "pests and vermin".

U.S. Pat. No. 4,998,091 Renner teaches mounting an ultrasonic device on a vehicle and U.S. Pat. No. 4,903,630 to Rezmer discloses an ultrasonic whistle to act as an animal warning device. It is well known that whistles typically have a very broad frequency spectrum and there is is no data presented to verify the presence of just ultrasonic energy. Moreover, U.S. Pat. No. 4,933,918 to Landsrath teaches an ultrasonic device to frighten noxious animals. "Noxious animals" are not defined in the Landsrath specification, but again the presumption is that Landsrath is targeting small mammals such as rats. Thus, these related art teach that sound that is audible to small mammals and inaudible to humans can be used to elicit a behavioral change in the small mammals.

It is important to note that none of these references (Jeffers, Malleolo, Renner, Rezmer and Landsrath) teach that a sound outside the audible range can be made audible (e.g., supersonic). In fact, all of these references appear to use the terminology "ultrasonic" to describe a sound that is inaudible to humans, while being audible to the targeted species.

In other related art, audio-frequencies may be used to alert birds (U.S. Pat. No. 5,450,063 to Peterson et al., U.S. Pat. No. 4,769,794 to Beuter et al., U.S. Pat. No. 4,656,770 to Nuttle, U.S. Pat. No. 4,475,102 to Troy et al.). Again, however, none of these references appear to teach the use of supersonic sound for alerting and/or repelling birds and other animals.

Finally, U.S. Pat. No. 5,774,088 to Kreithen teaches the use of electromagnetic (EM) energy to warn birds (specifically pigeons). The EM energy is absorbed in the birds and the tissue is heated causing the ears to be stimulated; however, it does not appear that the frequency needed to stimulate the ears is disclosed.

SUMMARY OF THE INVENTION

It is therefore an object of the present invention to provide an external stimuli to an animal in order to alert the animal to danger and/or repel the animal from a certain area.

It is still a further object of the present invention to provide an external stimuli to an animal that does not cause permanent harm to the animal.

It is another object of the present invention to provide an external stimuli to an animal that causes an uncomfortable sensation in the animal such that the animal is alerted of danger and/or repelled from a certain specific area.

It is yet another object of the present invention to provide an external stimuli to an animal which is well controlled and confined to certain specific areas.

It is also another object of the present invention to provide an external stimuli to an animal which does not interfere with electronic equipment used at facilities such as, for example, airports and the like.

The present invention describes several embodiments that create an external stimuli that alerts animals to danger and/or repels the animals from certain areas. More specifically, the system and method of the present invention uses an external stimuli, such as, for example, pulsing microwaves, vibration or supersonic sound waves, in order to alert birds or other animals of danger and/or repel these same birds or animals from specific areas. These produced external stimuli may provide a reversible unpleasant sensation to the birds and other animals so that they will not only be repelled from a specific area, such as an airport, but also will avoid returning to such area. One such unpleasant sensation that is virtually harmless to the birds and other animals is the sensation of dizziness.

In general, these several embodiments range from (i) pulsing microwaves in order to induce dizziness, (ii) sound waves producing a vibration in a substrate and (iii) supersonic acoustic energy for causing a vibration and/or dizziness in the animal. It has been found that the use of any of the methods (i)–(iii) do not permanently harm the animals.

In the case of pulsing microwaves, a directional antenna system may be used to minimize power loss over distances and to thereby apply maximal power to a precise area of intended microwave irradiation. In some applications, reflectors may be used to redirect the beam of the pulsed microwave energy to a larger area of interest. The use of the pulsed microwave may be remotely controlled, via a sensor, and may also be used with other systems, such as, for example, light and sound systems. The pulsed microwaves may also be timed to trigger every five or ten seconds (or other time).

A supersonic alerting and/or repelling system and method is also contemplated. The supersonic alerting and/or repelling system is implemented by the use of a projection of supersonic acoustic energy (beam) using a single or plurality of focused projectors at flying, walking or stationary birds or other animals. The supersonic acoustic energy, through experimentation herein, is now known to induce dizziness in the target animals, much like the use of microwaves as discussed above. The energy of the supersonic acoustic energy is converted to a vibration and propagated through fluid and bone such that the brain, skull and ear are vibrated at the ultrasonic frequency and at their natural resonant frequencies. This stimulates the inner ear in at least three modes, (i) soft tissue resonance, (ii) bone resonance and (iii) inertial difference resonance between inner and middle ears. The bodily resonance will then be conducted to the ear as pressure waves in either fluid or bone such that the vibrations will be discerned as audiofrequencies by the birds (or other animals).

Still a further embodiment uses a substrate shaker to produce sound waves which induce a vibration in a substrate. The sound waves propagate through a waveguide which is preferably filled with the ambient fluid or bottom siltsubstrate for inducing low frequency vibration displacement in shallow water where sound pressure waves can not propagate. The vibratory output of the substrate shaker is preferably low frequency (50 Hz) tones or noise that are generally pulsed at less than 100 Hz.

BRIEF DESCRIPTION OF THE DRAWINGS

The foregoing and other objects, aspects and advantages will be better understood from the following detailed description of a preferred embodiment of the invention with reference to the drawings, in which:

FIG. 13 shows brain resonance for large and small birds using the embodiment of FIG. 11; and FIG. 14 shows middle ear resonance for several species of animals using the embodiment of FIG. 11.

DETAILED DESCRIPTION OF A PREFERRED EMBODIMENT OF THE INVENTION

Figure 1:
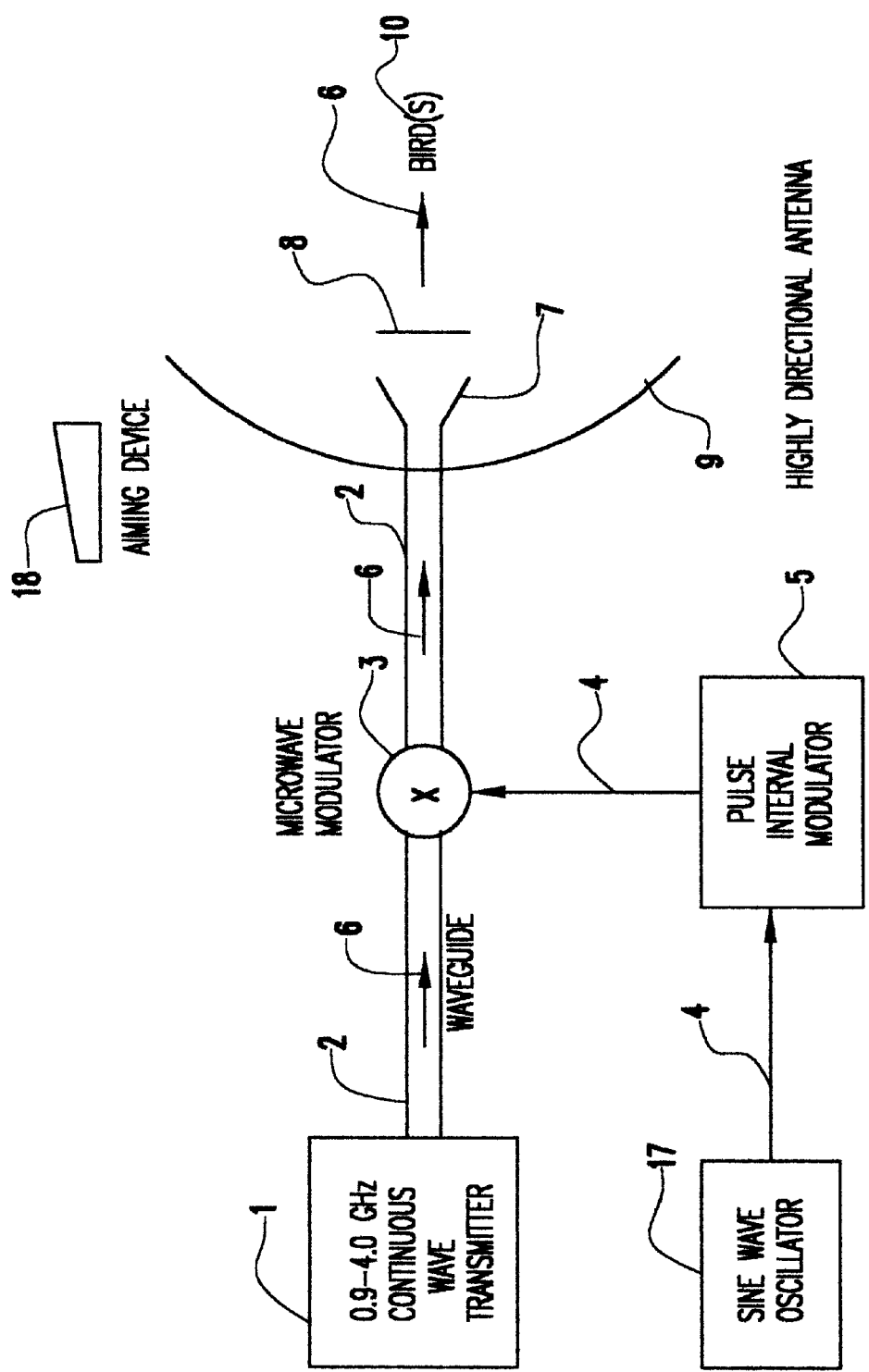
FIG. 1 shows a block diagram of a pulsing microwave apparatus causing dizziness in birds and other animals.

The present invention relates to a system and method of alerting and/or repelling birds and other animals. In general, the system and method of the present invention produces an external stimuli, such as, for example, pulsing microwaves, in order to alert birds or other animals (including humans) to danger and/or repel the birds or other animals from certain defined areas. These produced external stimuli may provide a reversible unpleasant sensation to the birds and other animals so that they will not only be repelled from a specific area, such as an airport, but also will avoid returning to such specific area. One such unpleasant sensation that is virtually harmless to the birds and other animals is the sensation of dizziness.

Being more specific, the present invention provides several embodiments for alerting and/or repelling birds and/or other animals. These embodiments range from (i) pulsing microwaves in order to induce dizziness, (ii) sound waves producing a vibration in a substrate and (iii) supersonic acoustic energy for causing a vibration and/or dizziness in the animal. Through extensive experimentation is has been found that the methods of (i)–(iii) discussed in more detail below are effective for alerting and/or repelling birds and other animals. A motivating factor of each of the embodiments of the present invention is that none of the methods (i)–(iii) permanently harm the animals.

Pulsing Microwaves In Order To Induce Dizziness

The inducement of dizziness is a highly unpleasant sensation which has been found through extensive experimentation to cause animals to avoid specific predefined areas, e.g., airports. In order to induce dizziness and thus accomplish the objectives-of the present invention (i.e., alerting and/or repelling animals), an embodiment of the present invention uses pulsed microwave energy to induce dizziness in target animals, such as, for example, birds.

The use of pulsed microwave energy has been found to induce dizziness by stimulating the absorbing structures in the balance system hair cells of target animals at frequencies specifically matched to the spectral sensitivity of the target animal. More specifically, it has been discovered that microwave pulses of substantially 20 to 100 microseconds in duration and in the frequency range optimally within 0.9 to 4.0 GHz generate a thermoelastic wave. This thermoelastic wave has been found to activate vertebrate hair cell mechanoreceptors which, in turn, results in dizziness of the target animals.

In order to implement the method and system of the presently described embodiment, a directional antenna system may be used to minimize power loss over distances and to thereby apply maximal power to a precise area of intended microwave irradiation. In some applications, reflectors may be used to redirect the collimated beam of the pulsed microwave energy to a larger area of interest. It is noted that microwave irradiation is not detectable by animals and humans outside of the beam pattern and will not be a nuisance to bystanders when redirected to a larger area of interest.

Referring now to FIG. 1, in an embodiment of the present invention, microwave energy is pulsed in a pattern designed to optimally induce activation of the vestibular balance system of an animal in order to induce dizziness. More specifically, FIG. 1 shows a microwave generating system which comprises a microwave transmitter 1 having the capability of generating a continuous wave output with a microwave frequency in the band of frequencies known to heat water, e.g., preferably 0.9 to 4.0 GHz. The output 6 of the microwave generating system is delivered along a waveguide 2 to any well known microwave modulating device 3, such as a ferrite modulator.

Still referring to FIG. 1, a sine wave oscillator 17 provides a sine wave to a pulse interval modulator 5, via preferably an electrical wire 4. The pulse interval modulator 5 may encode the sine waves, generated in the sine wave oscillator 17, in a pulse-interval modulation format. Pulse widths are preferably in the approximate range of 10 to 100 microseconds; however, other pulse widths are also contemplated for use by the embodiment of the present invention. The output from the pulse-interval modulator 5 is conducted to the microwave modulator 3 by preferably a common wire 4.

Thereafter, the modulated microwaves 6 are transmitted to a highly directional antenna 7, 8, 9 and aimed at intruding animals (e.g., birds 10) with an aiming device 18. In the embodiment thus described, the aiming device 18 may be (i) a telescopic sight, (ii) a laser pointer, (iii) an automated radar or sonar device, (iv) a microphone to hear birds placed at the parabolic antenna focus, (v) or other well known systems that can direct the directional antenna.

As further shown in FIG. 1, the directional antenna 7, 8, 9 may be capable of collimating the microwave beam to prevent dispersion of the microwave power over distance to the target animal and thus reducing the power requirements of the transmitter. This is preferably accomplished by coupling the energy 6 in the waveguide 2 through an impedance matching horn 7 to a primary reflecting surface 8 and then to the main parabolic reflecting surface 9 of the antenna. of course, it is well understood by one of ordinary skill in the art that other known methods for focusing the microwave energy are contemplated for use with the present embodiment.

As a further alternative, the antenna 7, 8, 9 may be permanently fixed at a particular area, such as the end of a runway or an electrical power substation. In this arrangement, a series of reflectors may be placed at various locations in order to direct the microwave beam around the perimeter of the substation or in a zigzag fashion to traverse the field at the end of a runway.

In a preferred embodiment, an operator would aim the beam at an intruding animal using the aiming device 18. It has been found through experimentation that by direct electro-physiological measurement of the hearing system, microwave pulses in the range of approximately 0.9 to 4.0 Ghz can stimulate the cochlea and affect the anatomically similar balance system of the target animal. However, organs of balance and hearing differ in the frequencies which they optimally respond; however, these organs respond to frequencies between 20 and 20,000 Hz, defined as the auditory range.

It is noted that organs of balance respond at frequencies dictated maximally by the rate at which an animal can turn its head, typically below 10 Hz. Accordingly, application of microwave pulses with the spectral distribution shown in FIGS. 2a and 2b appear to optimally stimulate hair cells in the vestibular balance system of the target animals. That is, the spectral distribution of microwave energy shown in FIGS. 2a and 2b has been chosen to match the operating frequency of the vestibular balance system of the target animal to thereby optimally stimulate the vestibular balance system of the target animals.

Figure 2A:
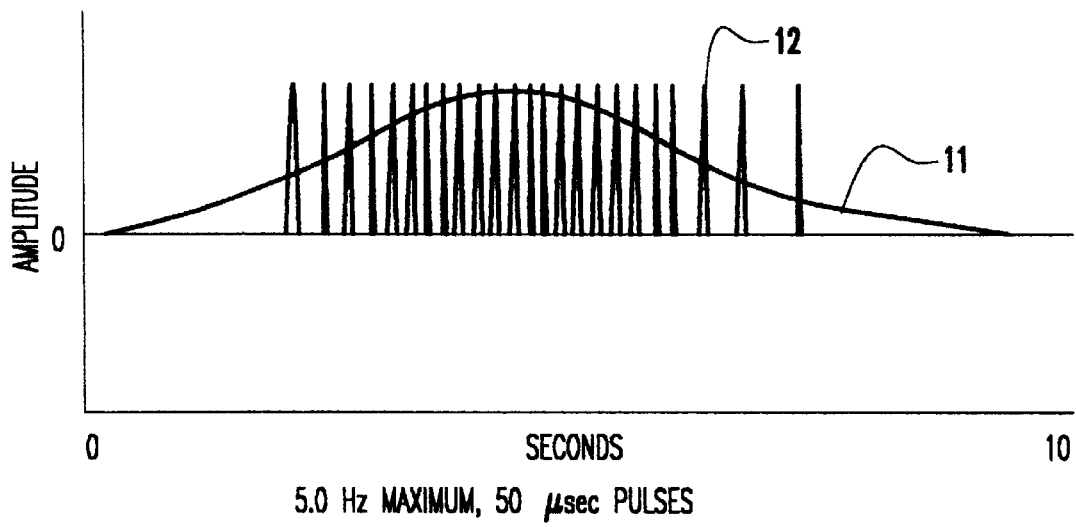
FIGS. 2a and 2b show the pulse distribution and its spectrum using the apparatus of FIG. 1.
Figure 2B:
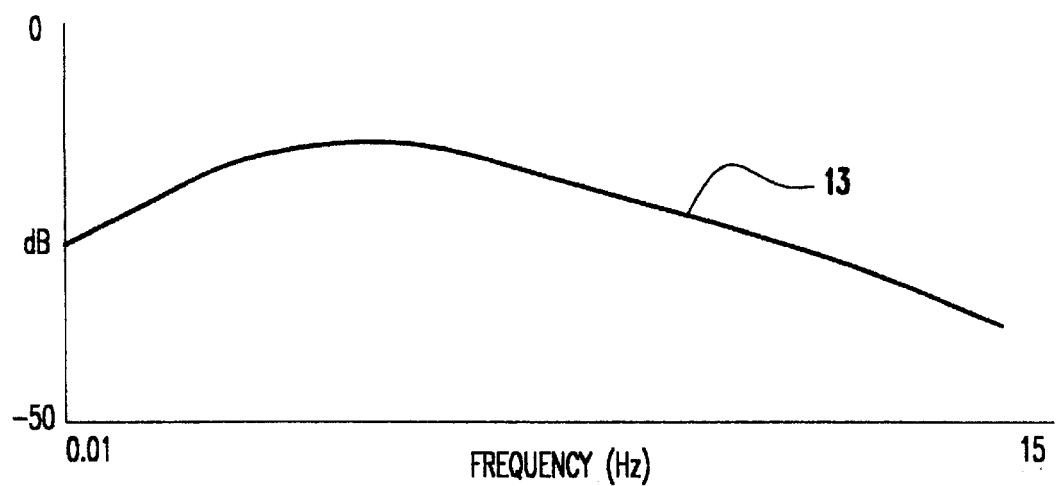

FIGS. 2a and 2b show the pulse distribution and its spectrum using the apparatus of FIG. 1. In particular, FIGS. 2a and 2b show the effect of using pulse-interval modulation generated by the apparatus of FIG. 1. A smoothed Fourier spectrum of pulses 12 modulated with a sine wave 11 having a frequency of 0.1 Hz is shown to be broadly expressed over a frequency range 13 from essentially zero to 15 Hz. The spectral response in this range is essentially independent of the width of the microwave pulses, but dependent on the maximal pulse rate, e.g., 5.0 Hz. The spectral response is only moderately dependent on the modulating frequency 11 or wave shape.

Figure 3:
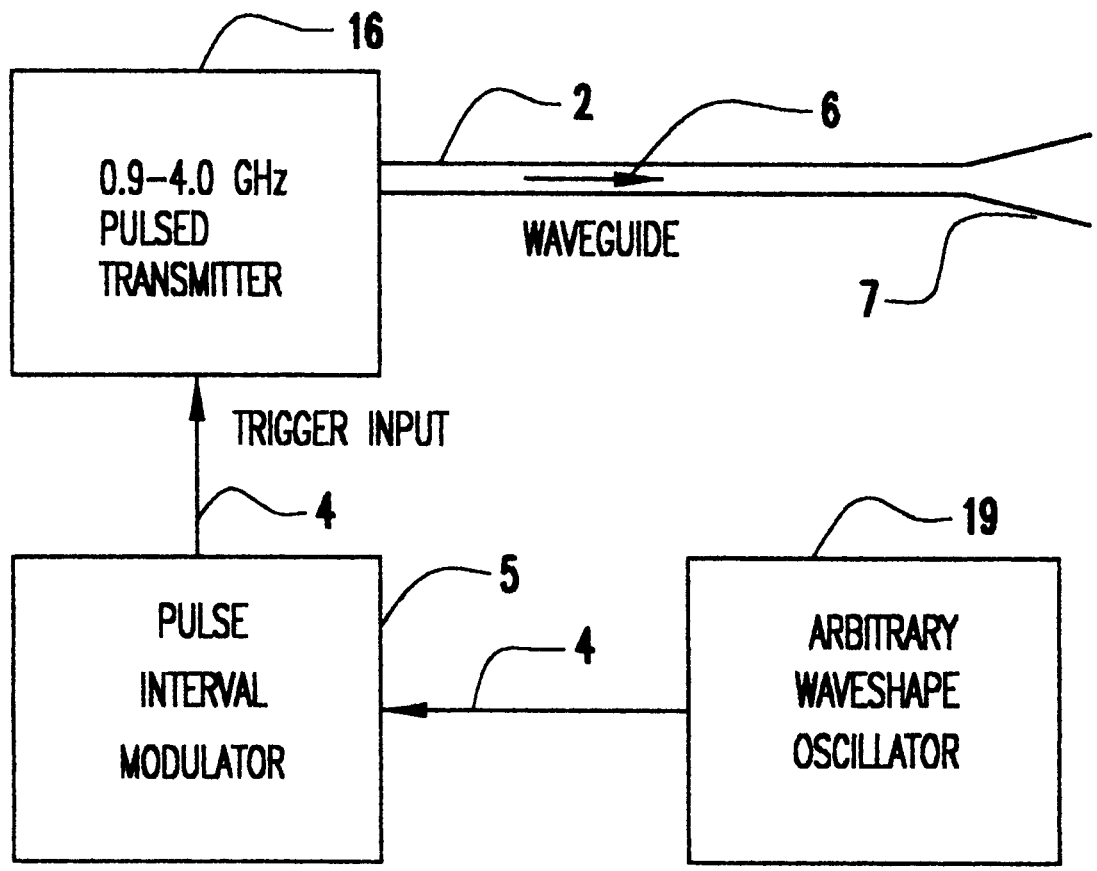
FIG. 3 shows a block diagram of an alternative embodiment of the microwave pulsing logic.

FIG. 3 shows that alternative modulating waveshapes may be generated by an arbitrary waveshape oscillator 19 rather than the sinusoidal waveshape oscillator 17 shown in FIG. 1. In this alternate embodiment, the pulse modulator 5 directly triggers the microwave transmitter 16. Although apparently simpler in a block diagram, long pulses are more difficult to achieve in the alternative system of FIG. 4. Other modulation approaches, such as rotating shutters or reflectors, is also contemplated by use by the present invention.

Figure 4A:
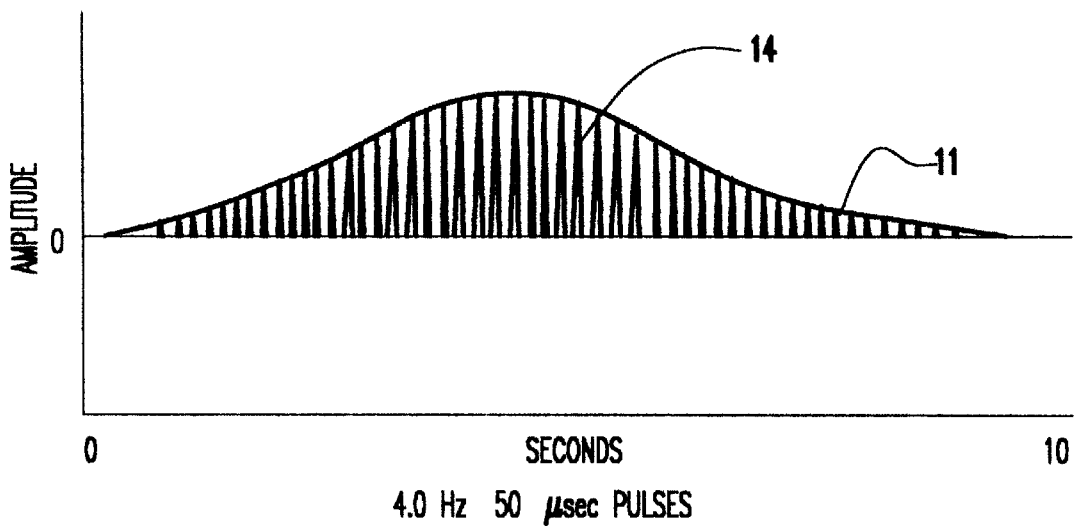
FIGS. 4a and 4b show the pulse distribution and its spectrum of the embodiment of FIG. 3.
Figure 4B:
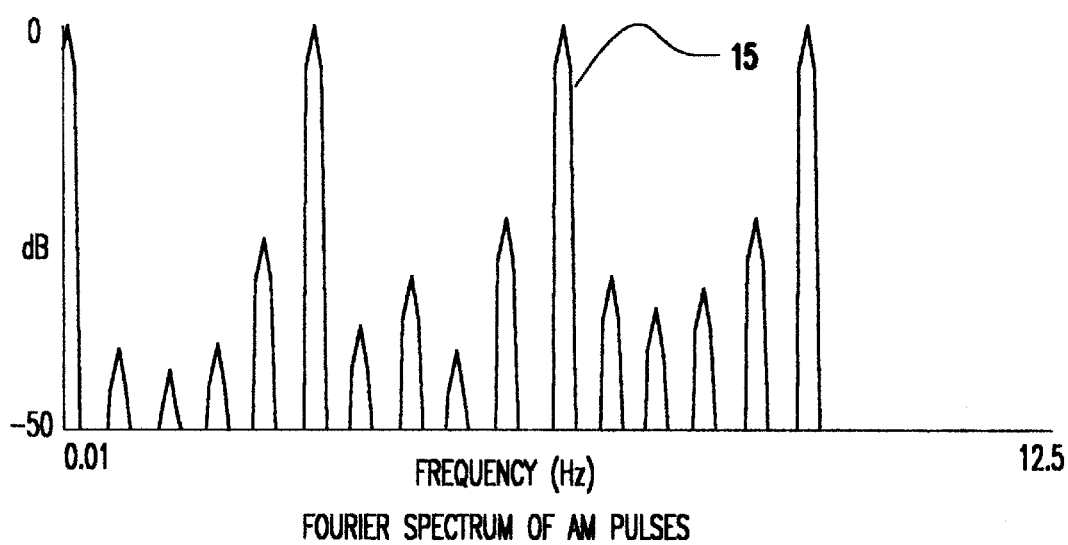

FIGS. 4a and 4b show the pulse distribution and its spectrum of the embodiment of FIG. 3. As seen in FIGS. 4a and 4b, a conventional pulse amplitude modulation (AM) approach generating a smoothed Fourier spectrum of pulses 14 modulated with a sine wave 11 also induces energy across the desired frequency range 15. Other modulation schemes, such as conventional frequency modulation (FM), may also prove to be useful for operational or economic reasons.

It has been found that on first application of the embodiment of the present invention, individual animals may not immediately realize how to avoid the sensation of dizziness, but with repeated application the animals will learn to associate the irradiated area with the sensation of dizziness and thus avoid the irradiated area in the future. Moreover, animals will come to associate their dizziness with the low frequency sound induced by the higher frequencies in the induced spectral range, and thus avoid the sonic field.

It is important to note that the work of Lebovitz employed pulse and CW microwaves at high power in order to heat the inner ear and create an inner ear fluid flow, which would stimulate the balance organs. However, at high power the brain will absorb most of-the microwave energy causing neuronal destruction by heating such that the ataxic birds would appear dizzy because of brain damage. Further Lebovitz did not employ any amplitude modulation (just pulse & CW). In contrast, the present invention, as discussed above, uses an optimal frequency to stimulate the vestibular system (i.e., very low frequency of less than 10 Hz). To provide this type of frequency stimulation, the present invention pulses amplitude modulate low frequencies on the carrier that is readily absorbed by the bird's body. Thus, by using the much lower carrier level, only a reversible sensation of dizziness is displayed by the present invention. It is actually the demodulating of the low frequency pulses that stimulates the inner ear balance receptors, by resonating them not by heating as with Lebovitz.

Substrate Shaker for Bird and Animal Repelling

It has been found through extensive experimentation that birds are repelled by propagating sound waves through a substrate (e.g., vibration), such as water, concrete and the like. In mammals, frequencies typically ranging between 5–50 Hz produce a flutter sensation in the somatosensory system. The nervous system phase locks to this form of stimulation, making it perceptually salient and which induces multisensory activity that serves as alerting and orienting reflexes. If visual stimulation (i.e., aircraft) is simultaneously present, increased activation of the multi-sensory pathway is likely and habituation may be reduced.

In keeping with the above concepts, the presently disclosed embodiment is directed to a vibratory substrate coupled waveguide device. It is expected that the device will be used in areas where birds or other animals pose safety/health problems (i.e., airports) or places where birds are considered a nuisance and may cause additional problems to property. In general, the disclosed embodiment includes an enclosed transducer, a water or substrate waveguide and a specialized circuit for delivering pulses or tonal stimuli to the substrate and birds resting thereupon. The frequency spectra of the stimuli will be restricted to frequencies below 60 Hz. As will be discussed, the stimulation produced by this embodiment will be vibration via a sealed and buried transducer with a fluid/substrate coupled waveguide in order to reduce impedance mismatches utilizing frequencies below those reported in related art (since primitive birds such as pigeons, chickens and waterfowl have very low frequency sensitivity to vibration by skin and inner ear receptors).

Figure 5:
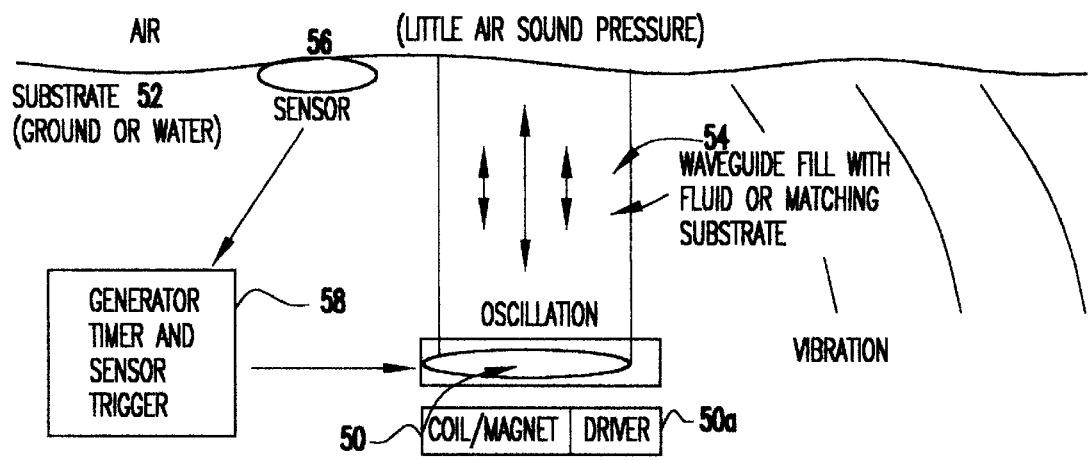
FIG. 5 shows a substrate shaker of the present invention.

Referring to FIG. 5, a substrate shaker of the present embodiment is disclosed. In the preferred embodiment of the substrate shaker, the substrate shaker comprises an electromagnetic (or magnoconstrictive, electromechanical or related technology) coil/magnet 50 preferably encased in a water proof container buried or submerged in a substrate 52. The coil/magnet 50 is driven by an audiofrequency circuit 50a producing pulses or tonal stimuli with vibrational spectral energy below 60 Hz. In the embodiments, the substrate 52 may be water, earth, or other substrates and the like. It is also readily recognized by one of ordinary skill in the art that the coil/magnet 50 does not have to be encased in a waterproof container, nor does the coil/magnet 50 have to be buried in the substrate 52 in order for it to work in its intended manner (e.g., create vibration using sound waves).

The vibratory output of the coil/magnet 50 is low frequency (50 Hz) tones or noise that are generally pulsed at less than 100 Hz. By experimentation, it was found that a rare earth magnet (neodymium)/coil ferrofluid cooled coil/magnet 50 encased in a rugged airtight polycarbonate "clam shell", delivered vibratory energy in the 5–50 Hz range to each medium (e.g., ambient fluid or bottom silt-substrate) within the waveguide 54. It is also now known that the sound pressure element of the coil/magnet 50 may be reduced while the vibratory component is enhanced when the waveguide 54 is filled with substrate or fluid of efficient wave propagation. For example, the coil/magnet 50 may be placed underwater and the waveguide 54 may be filled with the ambient fluid or bottom silt-substrate for inducing low frequency vibration displacement in shallow water where sound pressure waves can not propagate.

Still referring to FIG. 5, a sensor 56 may be used to remotely activate the coil/magnet 50 via a low frequency generator/timer/sensor trigger component 58 (low frequency component 58). In this manner, when a bird or other animal approaches the sensor 56, a signal will be transmitted to the low frequency component 58 which, in turn, activates the coil/magnet 50 (see FIG. 8). In an alternative embodiment, the low frequency component 58 and the coil/magnet 50 may be one integral unit such that the sensor 56 remotely transmits a signal to the one integral unit for activation thereof. The sensor 56 may be a photo sensor, microwave device, pressure sensor or other well known sensor that will activate upon a stimuli, such as a bird flying overhead. The coil/magnet 50 may also be controlled remotely so as to be activated in synchrony with other devices such as sound, microwave, or light systems.

Figure 6:
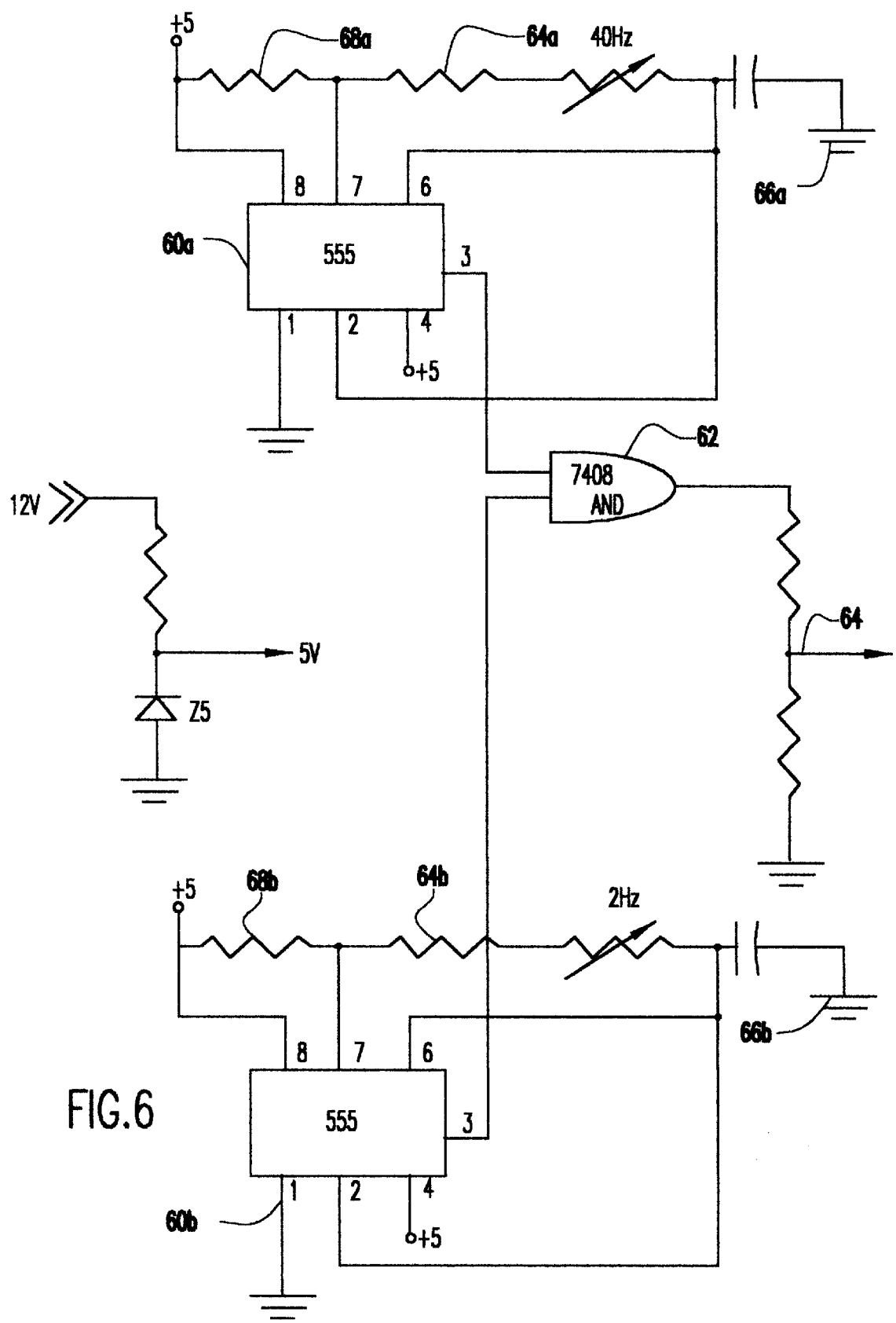
FIG. 6 shows a pulse network of the substrate shaker of FIG. 5.

Now referring to FIGS. 5 and 6 simultaneously, the coil/magnet 50 may be activated by the low frequency component 58 via a timer mechanism ("pulse generation"). In this instance, the coil/magnet 50 may be "pulsed" in order to activate at predefined intervals, such as every five or ten seconds. FIG. 6 shows one embodiment of a pulse network that may be used to activate the coil/magnet 50 at the predefined intervals. In this embodiment, two timers 60a, 60b have outputs connected to an "and" gate 62. The "and" gate 62 is connected to an output 64 that provides pulsed (timed) signals to the coil/magnet 50 so as to activate the coil/magnet 50 at the predefined intervals. For stable operation of an oscillator, the free running frequency and duty cycle are controlled with two external resistors 64a and 68a, 64b and 68b and one capacitor 66a, 66b for each timer 60a, 60b, respectively.

Figure 7:
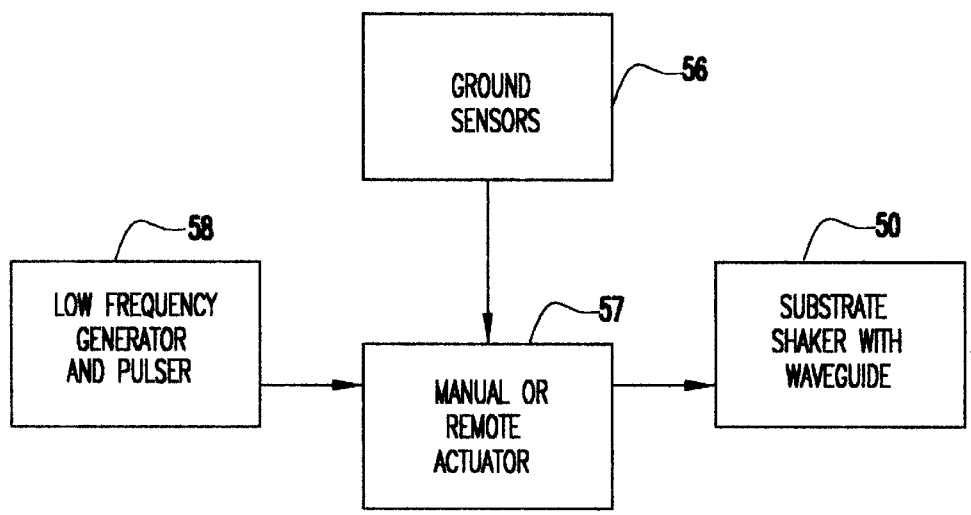
FIG. 7 shows a block diagram of the substrate shaker of FIG. 5.

FIG. 7 shows a block diagram of the substrate shaker of FIG. 5. The block diagram of FIG. 7 shows the low frequency component 58 and sensor 56 connected to a manual or remote actuator 57. The manual or remote actuator 57 triggers the coil/magnet 50 (substrate shaker).

Figure 8:
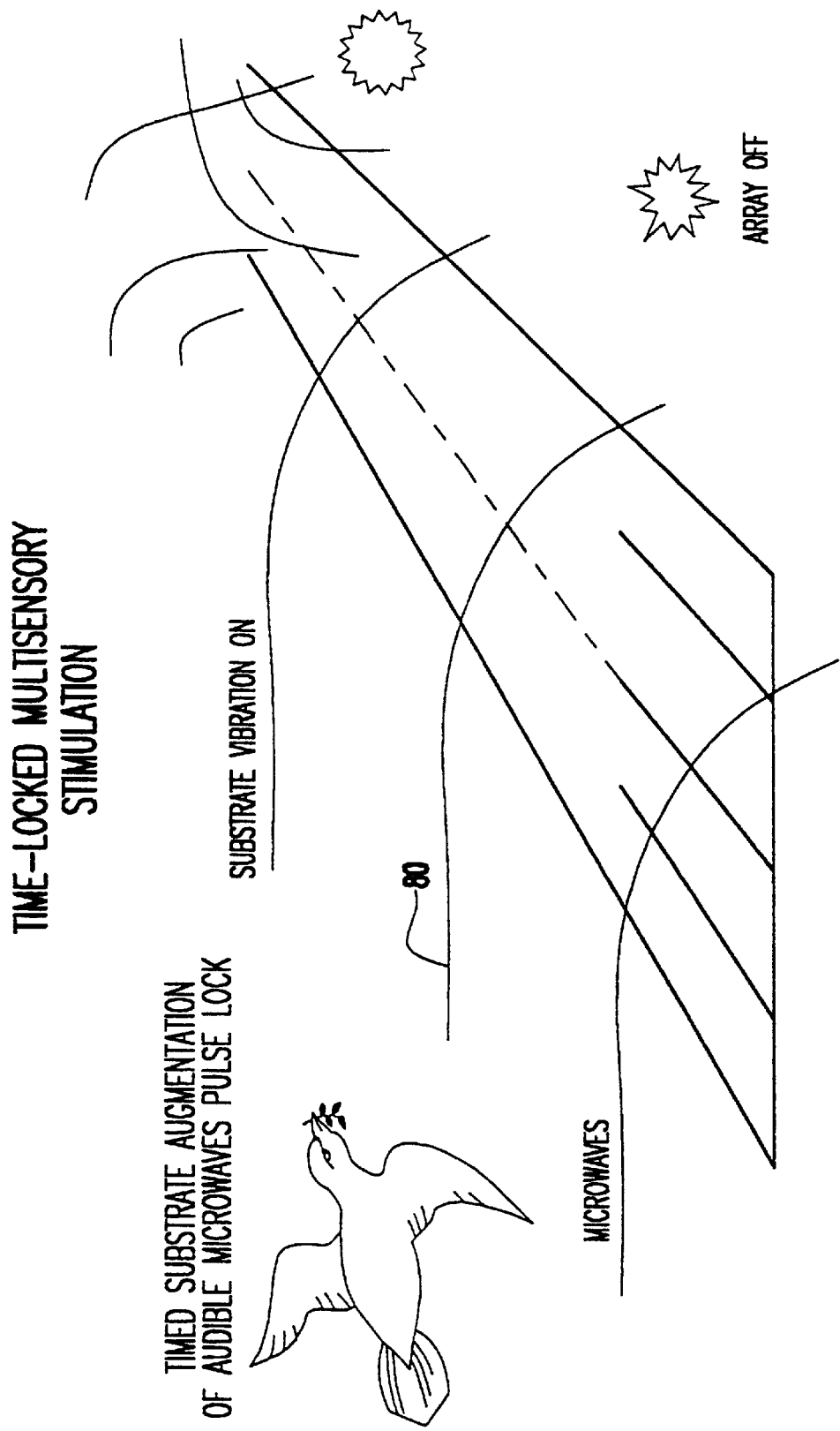
FIG. 8 shows a time-locked multi-sensor simulation using the substrate shaker of FIG. 5.

FIG. 8 shows a time-locked multi-sensor simulation using the substrate shaker of FIG. 5. In this Figure, the sensor 56 is a microwave device which produces microwaves 80. Upon disturbance of the microwaves 80, such as a bird 82 flying through the microwaves 80, the coil/magnet 50 will be activated. In this embodiment, the coil/magnet 50 is time locked.

Several experiments were conducted to determine the efficacy of the vibrational disturbances resulting from the embodiment of the present invention. Through experimentation, it has been found that vibrational disturbances tend to repel animals. For example, the substrate shaker, as discussed in detail above, was tested with four domestic ducks over a period of four days with ten trials per day. The birds would generally startle on the first few trials over the first few days, but would subsequently habituate. The ducks would always orientate with no habituation. The ducks avoided the vibration for all trials on two consecutive days, thereafter the responses decreased in the absence of negative reinforcement. This is evidence of repelling.

Figure 9:
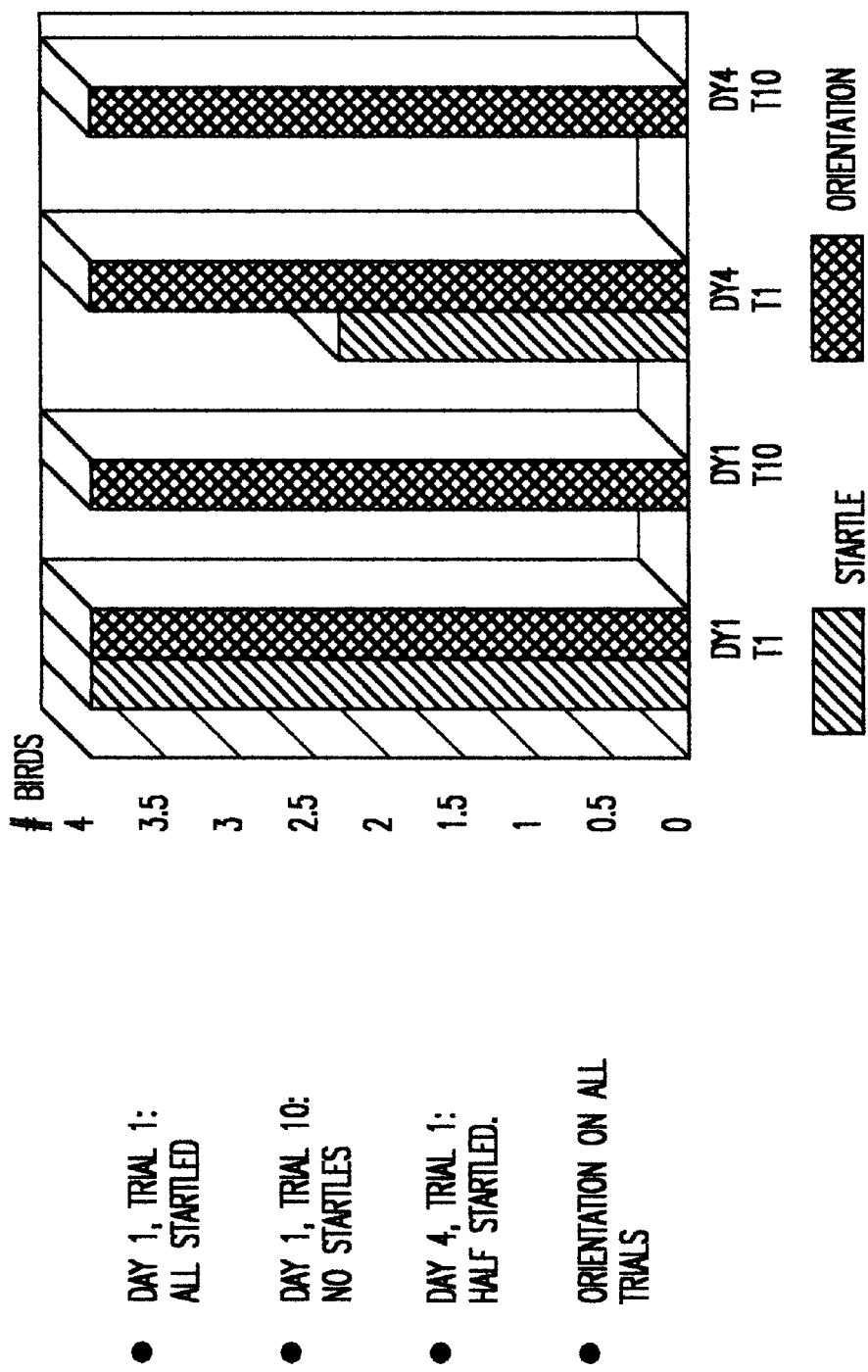
FIG. 9 shows a graph of "startles" and orientation of birds using the method as described with reference to FIG. 5.

More specifically, FIG. 9 shows a graph of "startles" and orientation of birds using the method as described with reference to FIG. 5. FIG. 9 shows a four day experiment with ten trials per day. In sum, at day one, trial one, all birds were startled (bodily-contraction to sound/vibration); however, by day one, trial ten, there were no startles. By day four, trial one, half of the birds were startled. Throughout the experiment there was orientation on all trials (i.e., oriented their heads searching for the source of the vibration).

Thus, there was nervous system suppression for the startle reflex but continued facilitation to search for the vibration (FIG. 9). After orientation all birds move as far away from the vibration as possible (e.g., the corner of cage); however, on day four the birds oriented but generally didn't move, i.e., habituation. It is has thus been found that the combination of the substrate shaking at frequencies that resonate the bird's bodies and ears is far less prone to be ignored than previous systems.

Figure 10:
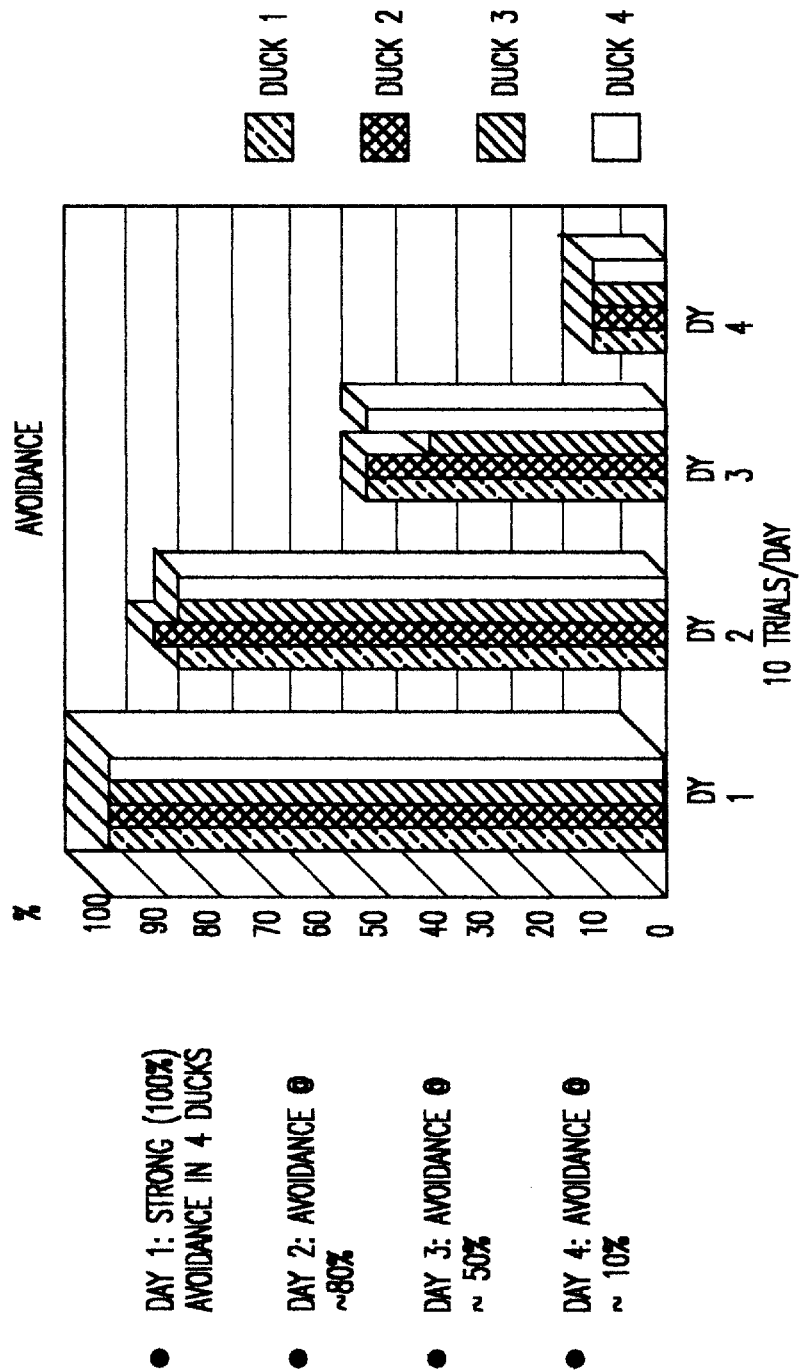
FIG. 10 shows a graph of avoidance of pulsed substrate vibration using the method as described with reference to FIG. 5.

FIG. 10 shows a graph of avoidance of pulsed substrate vibration using the method as described with reference to FIG. 5. Similar to FIG. 9, FIG. 10 shows a four day experiment with ten trials per day. In sum, at day one, avoidance by the ducks was at 100%. At day two, avoidance was at approximately 80% and at day three avoidance was at about 50%. By day four, avoidance was at approximately 10%.

Supersonic Alerting and/or Repelling System and Method

A supersonic alerting and/or repelling system and method is implemented by the use of a projection of supersonic acoustic energy using a single or plurality of focused projectors at flying, walking or stationary birds or other animals. The supersonic acoustic energy, through experimentation herein, is now known to induce dizziness in the target animals, much like the use of microwaves as discussed above.

Although an understanding of the specific mechanism for alerting and/or repelling birds and other animals using supersonic acoustic energy is not currently known, it is presently hypothesized that supersonic acoustic energy is outside the conventional range of hearing, and is absorbed by the bird's (or other animal's) body. The energy of the supersonic acoustic energy is then converted to a vibration and propagated through fluid and bone such that the brain, skull and ear are vibrated at the ultrasonic frequency and at their natural resonant frequencies. This stimulates the inner ear in at least three modes, (i) soft tissue resonance, (ii) bone resonance and (iii) inertial difference resonance between inner and middle ears. The bodily resonance is then conducted to the ear as pressure waves in either fluid or bone such that the vibrations are discerned as audiofrequencies by the birds (or other animals).

It is noted that "supersonic" is defined (for humans) in U.S. Pat. Nos. 4,982,434 and 5,047,994 both to Lenhardt et al. and incorporated by reference herein in their entirety. In U.S. Pat. No. 4,982,434, "supersonic" is defined as sound above the acknowledged limit of hearing. In U.S. Pat. No. 5,047,994 "supersonic" is defined as the form of bodily vibration perceived as an auditory perception and as sound pressure above the audible range, detected and perceived as an auditory perception.(See, Lenhardt et al., 1991 *Science*).

Lenhardt and others (see review in *Science*, 1991) have demonstrated that humans can detect ultrasonic frequencies from approximately 20–100 kHz, thus these frequencies should be termed supersonic. With regard to birds, it is well established that the upper limit of hearing is about 10 kHz, although some raptors may have a higher hearing threshold (there are no known documented cases of birds with hearing above 15 kHz (Webster et al., 1991 *Evolutionary Biology of Hearing*)). Thus, frequencies above 15 kHz can be termed ultrasonic (inaudible) for birds; however, if birds have a mechanism that can convert some ultrasonic frequencies into an audible form, those frequencies are termed supersonic. (There exists no known prior art at the time of reduction of the present invention identifying supersonic hearing in birds or other animals other that of Lenhardt et al., in humans).

Referring now to the specific embodiment of FIGS. 11–14, a supersonic audio beam is projected at an animal target so as to interact with the target's body to produce an auditory or vestibular sensation. As discussed above, while not bound by any specific theory, it is hypothesized that the supersonic alerting and/or repelling method is based on a system of hearing quite distinct from conventional air conduction hearing; that is, the supersonic alerting and/or repelling method utilizes a type of fluid/bone conduction hearing not previously described with reference to birds.

It is theorized that the bird's brain is set into resonance by an external beam of a well defined frequency (as discussed below). Through experimentation, it is now known that approximately 60 dB of energy is reflected by the feathers/skin of the bird, but energy above this impedance boundary is absorbed by the target body. The absorption of the energy sets the brain into oscillation, one component being a natural resonance that varies as a function of the brains diameter, i.e., assuming the diameter of most birds' brains are within the 1–2 cm range, the resonance will be in approximately the 35–120 kHz range depending on other factors such as geometry (FIG. 13). Thus, by producing a supersonic beam in the brain's resonance range, a maximal oscillation is produced such that the brain will interact with the skull producing a bone conducted frequency at its resonance frequency (7–10 kHz). This will cause the relative displacement of the brain and skull (generally in phase) to be out of phase with the movement of the middle ear bone (columella) due to its inertia, and each middle ear bone will be consequently set into its natural resonance frequency at about 3.5 kHz (FIG. 14). The bird will then perceive a sound that has the characteristics of a natural auditory experience, other than it will be binaural, as a result of supersonic stimulation.

Figure 12:
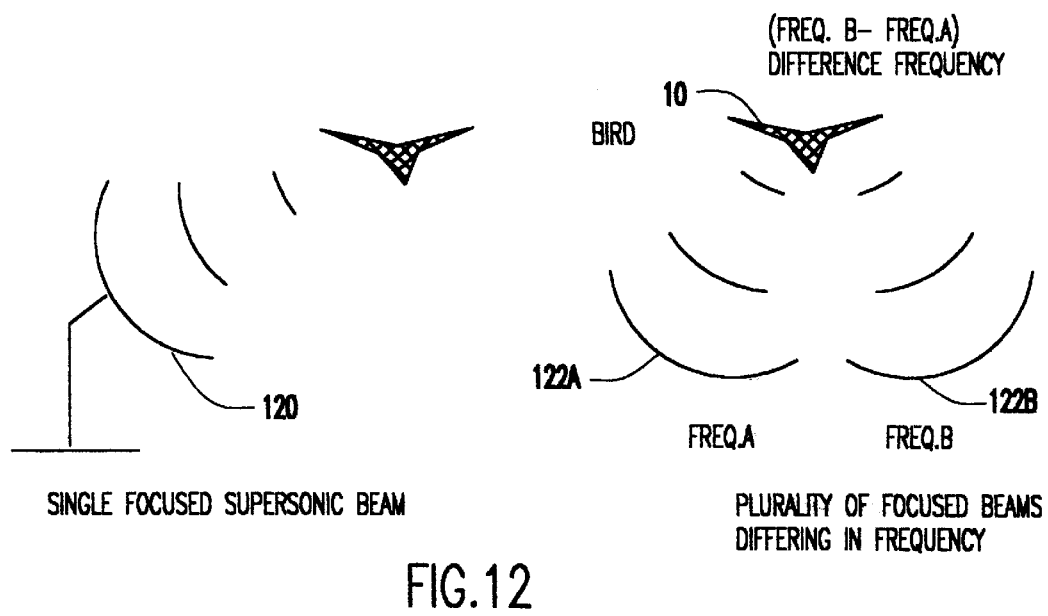
FIG. 12 shows focused beams on a bird using the embodiment of FIG. 11.

In the case of using two different frequencies to alert and/or repel the target, a third difference frequency is created (see discussion of FIG. 12). If the difference frequency is within the audible range of the bird it will be processed as any audible frequency. If, however, the difference frequency is less than 10 Hz, the vestibular system may be affected causing dizziness. It is also possible that supersonic frequencies alone, with or without difference frequency generation, can also produce dizziness or a sense of imbalance since such symptoms are reported by humans due to airborne supersonic stimulation (Kryter, The Effects of Noise on Man, 1970).

Figure 11:
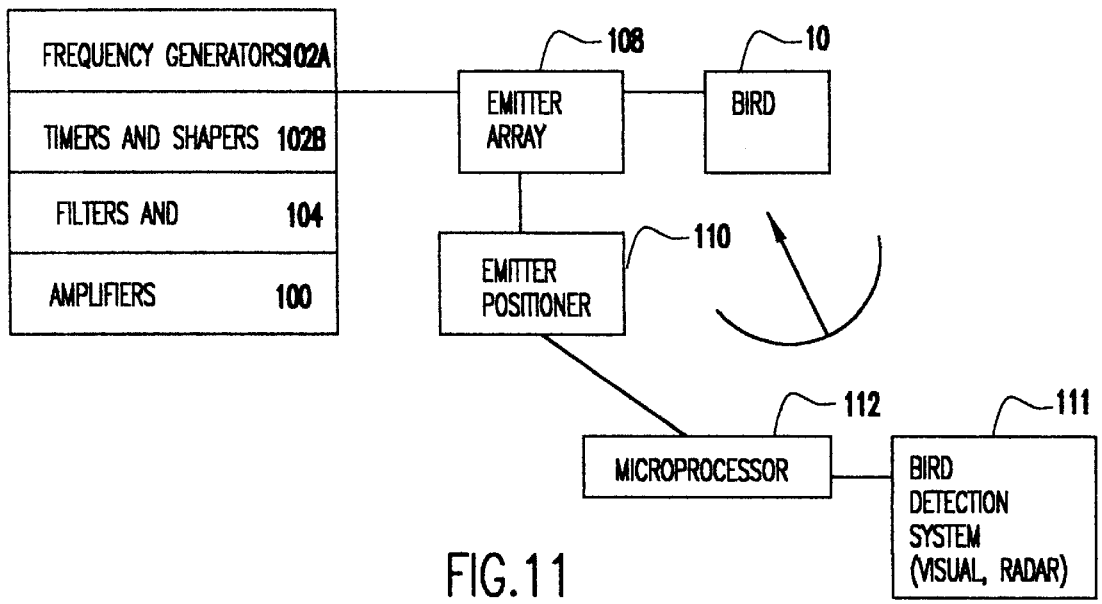
FIG. 11 shows a block diagram of an apparatus emitting a supersonic beam of an embodiment of the present invention.

Now referring specifically to FIG. 11, a block diagram of an apparatus emitting a supersonic beam which includes an audio oscillator (or a plurality of oscillators in the case of more than one beam) 100 for generating frequencies in the supersonic region, i.e., 11–200,000 kHz for birds, is shown. The signals are transmitted to an emitter(s) 108, and may be a continuous signal producing a continuous wave (CW) at the emitter(s) 108, or a pulsed signal with a pulse width (duration) generally in the 50–100 ms range. In the preferred embodiment, the pulse range is approximately 10–50 pulses per second and is generated by a timer 102a.

All signals pass through a power amplifier 106 to create pressures at the target 10 of approximately 140 dB ml Pa. Frequencies in the supersonic range described herein do not propagate long distances and as a result the supersonic projected area will not interfere with operations such as at an airport. It should be pointed out that the supersonic beam may not necessarily be pointed skywards, but may be vehicle mounted or aimed in other directions (e.g., down a runway for use in airports). The supersonic beam will be most useful near water, alerting birds approaching active runways.

Still referring to FIG. 11, a filter 104 is provided so that the purity of the supersonic frequencies are ensured when such signal is a noise or noise burst. An emitter(s) positioning device 110 is also provided so that the supersonic beam can be focused on a specific area or target 10. The latter is essential since two or more beams must intersect to generate the difference frequency while the target is moving. The emitter(s) positioning device 110 includes a radar 111 for tracking the target 10 and a microprocessor 112 to adjust the beam at the target 10. It is noted that a wave shaper 102b may also be used to alter the shape of the wave.

FIG. 12 shows a single focused supersonic beam 120 and a plurality of focused beams 122a, 122b. These beams are directed to a target 10, and will induce dizziness in the target 10 at the proper frequency (as discussed above). As thus seen, the embodiment of the present invention may include the use of two or more supersonic audio beams that intersect at a target which produces a difference tone(s) at the target. The difference tone will fall within the targets auditory sensitivity, less than 10 KHz and generally at about 2–3 kHz for a bird. If the difference frequency is less than 10 Hz, the vestibular system may be affected causing dizziness. If difference frequencies are used, two sources will be fed into separate emitters 108 and not mixed electronically. It is noted that precise digital signal generation may be necessary for the low difference frequencies for stimulating the vestibular system of the target 10.

It is well understood that the above discussion is not limited to the alerting and/or repelling of birds. It is readily apparent that one of ordinary skill in the art can adopt the above described altering and/or repelling method to be used with other animals, including humans.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method for alerting or repelling an animal, comprising:

irradiating a region to be protected with a collimated amplitude modulate low frequency microwave beam with frequencies in the water heating range; and pulsing the collimated microwave beam with a temporal pattern to stimulate a vestibular system of the animal without permanently harming the animal, wherein the pulsed collimated microwave beam is pulsed at substantially 20 to 100 microseconds in duration and in a frequency range substantially within 0.9 to 4.0 Ghz.

2. The method of claim 1, further comprising:

concentrating the collimated microwave beam in a tight beam; and directing the tight beam to a specific area to be protected.

3. The method of claim 1, further comprising stimulating absorbing structures in balance system hair cells of the animal with frequencies matched to a spectral sensitivity of the animal using the collimated microwave beam.

4. The method of claim 1, wherein the pulsing the microwaves generates a thermoelastic wave in order to activate balance system hair cells thereby inducing dizziness in the animal.

5. A method for alerting or repelling an animal, comprising:
   propagating sound waves through a waveguide; and
   creating a vibration in a substrate having a frequency below 60 Hz,
   wherein the vibration is created by the propagating sound waves propagating through the waveguide to a surface of the substrate.

6. The method of claim 5, wherein the vibration induces multisensory activity that serves as alerting and orienting reflexes of the animal.

7. The method of claim 5, wherein the substrate is water and the waveguide is filled with ambient fluid or bottom silt-substrate for inducing low frequency vibration displacement in shallow water where sound pressure waves can not propagate.

8. The method of claim 5, further comprising remotely activating the propagating sound waves.

9. The method of claim 5, further comprising pulsing the propagating sound waves at predetermined time intervals.

10. The method of claim 5, further comprising sensing an animal prior to propagating the sound waves with a sensor.

11. An apparatus for alerting or repelling animals, comprising:
    an electromechanical shaker;
    an audiofrequency circuit for driving the electromechanical shaker, the audiofrequency circuit producing pulses or tonal stimuli with vibrational spectral energy below 60 Hz; and
    a medium filled waveguide for propagating the vibrational spectral energy to a surface of a substrate.

12. The apparatus of claim 11, further comprising a timer for activating the electromechanical shaker at predetermined intervals.

13. The apparatus of claim 11, wherein the electromechanical shaker is an electromagnetic coil/magnet encased in a water proof container.

14. The apparatus of claim 13, wherein the electromagnetic coil/magnet is a rare earth element magnet/coil cooled with ferrofluid and the container is an airtight polycarbonate shell.

15. The apparatus of claim 11, further comprising a sensor to remotely activate the electromechanical shaker.

16. The apparatus of claim 15, wherein the sensor is a photo sensor, microwave device or a pressure sensor.

17. The apparatus of claim 11, further comprising at least a second electromechanical shaker, the electromechanical shaker and the at least second electromechanical shaker are operated in sequential fashion so as to systematically treat a specific area with the vibration.

18. A method of alerting or repelling an animal, comprising:
    projecting a supersonic audio beam at the animal so as to interact with the animal's body to produce an auditory or vestibular sensation, wherein the supersonic audio beam causes dizziness in the animal by stimulating an inner ear of the animal,
    wherein approximately 60 dB of energy of the supersonic audio beam is reflected by the body of the animal and energy above this impedance boundary is absorbed by the animal body, whereby
    a relative displacement of the brain and skull will be out of phase with movement of the middle ear bone of the animal due to its inertia, and
    each middle ear bone will be set into its natural resonance frequency at about 3.5 kHz.

19. The method of claim 18, wherein the supersonic audio beam is in the frequency range between 11–200,000 kHz.

20. A method of alerting or repelling an animal, comprising:
    projecting a supersonic audio beam at the animal so as to interact with the animal's body to produce an auditory or vestibular sensation, wherein the supersonic audio beam causes dizziness in the animal by stimulating an inner ear of the animal,
    wherein a pulse range of the supersonic audio beam is approximately 10–50 pulses per second.

21. A method of alerting or repelling an animal, comprising:
    projecting a supersonic audio beam at the animal so as to interact with the animal's body to produce an auditory or vestibular sensation, wherein the supersonic audio beam causes dizziness in the animal by stimulating an inner ear of the animal,
    wherein the supersonic audio beam is at least two supersonic audio beams that intersect at the animal and produce a difference tone at the animal, the difference tone falls within the animals auditory sensitivity.

22. The method of claim 21, wherein the least two supersonic audio beams that intersect at the animal and produce a third signal which is within the animal's ear's range of detectability.

23. An apparatus for alerting or repelling an animal, comprising:
    a plurality of oscillators for generating frequencies in the supersonic region thereby creating a supersonic audio beam in the frequency range between 11–200,000 kHz;
    a power amplifier creating pressures at the animal of approximately 140 dB ml Pa via the supersonic audio beam; and
    a plurality of emitter positioning devices for focusing the supersonic beam on a specific area or the animal.

24. The apparatus of claim 23, wherein the plurality of oscillators includes at least two oscillators, the at least two oscillators create at least two supersonic audio beams that intersect at the animal and produce a difference tone at the animal, the difference tone falls within the animals auditory sensitivity at less than 10 KHz.

25. The apparatus of claim 24, wherein the supersonic audio beam is a continuous signal producing at least one of continuous wave (CW) and a pulsed signal with a pulse width approximately in the 50–100 ms range.

26. The apparatus of claim 23, further comprising a filter to filter supersonic frequencies of the supersonic audio beam.

27. The apparatus of claim 23, further comprising a positioner for positioning the plurality of emitter positioning devices.

28. The apparatus of claim 27, wherein the positioner includes a radar for tracking the animal and a microprocessor to adjust the supersonic audio beam at the animal.

* * * * *